United States Patent
Kurokawa

(10) Patent No.: US 9,440,678 B2
(45) Date of Patent: Sep. 13, 2016

(54) VEHICLE FRAME STRUCTURE

(71) Applicant: TOYOTA JIDOSHA KABUSHIKI KAISHA, Toyota-shi, Aichi (JP)

(72) Inventor: Hiroyuki Kurokawa, Nisshin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/771,264

(22) PCT Filed: May 22, 2014

(86) PCT No.: PCT/JP2014/063597
§ 371 (c)(1),
(2) Date: Aug. 28, 2015

(87) PCT Pub. No.: WO2014/203680
PCT Pub. Date: Dec. 24, 2014

(65) Prior Publication Data
US 2016/0016609 A1    Jan. 21, 2016

(30) Foreign Application Priority Data

Jun. 17, 2013 (JP) ................................. 2013-126720

(51) Int. Cl.
| B62D 25/00 | (2006.01) |
| B62D 21/15 | (2006.01) |
| B62D 21/02 | (2006.01) |
| B62D 25/04 | (2006.01) |
| B62D 29/00 | (2006.01) |

(52) U.S. Cl.
CPC ............ B62D 21/15 (2013.01); B62D 21/02 (2013.01); B62D 25/04 (2013.01); B62D 29/005 (2013.01)

(58) Field of Classification Search
CPC ...... B62D 21/02; B62D 21/15; B62D 27/02; B62D 27/023; B62D 29/005; B62D 25/04
USPC ............. 296/203.01–203.04, 29, 30, 193.08, 296/193.09, 187.11, 187.03, 187.09, 187.1, 296/2, 205
See application file for complete search history.

(56) References Cited

U.S. PATENT DOCUMENTS

| 6,199,940 B1 * | 3/2001 | Hopton ................. B60J 5/0447 296/146.6 |
| 7,735,906 B2 * | 6/2010 | Takahashi ............. B62D 25/04 296/187.02 |

FOREIGN PATENT DOCUMENTS

| JP | 2008-126835 A | 6/2008 |
| JP | 2008-267393 A | 11/2008 |
| JP | 2010-195352 A | 9/2010 |

* cited by examiner

*Primary Examiner* — Dennis H Pedder
(74) *Attorney, Agent, or Firm* — Kenyon & Kenyon LLP

(57) ABSTRACT

A frame structure of a vehicle, including a frame member with a closed cross-section structure including plural wall portions configuring the frame, and a reinforcement member made of a fiber reinforced plastic and provided to an inner portion of the closed cross-section structure of the frame member. The reinforcement member includes a fan shaped longitudinal wall portion, and a bottom wall portion from which the longitudinal wall portion protrudes out, and the bottom wall portion joins one end portion and another end portion of an arc of the longitudinal wall portion that are oriented in a row along a length direction of the frame member to an inner face of a wall portion at a compression deformation side of the frame member that undergoes bending deformation due to the front side member being input with load.

7 Claims, 9 Drawing Sheets

FIG.8
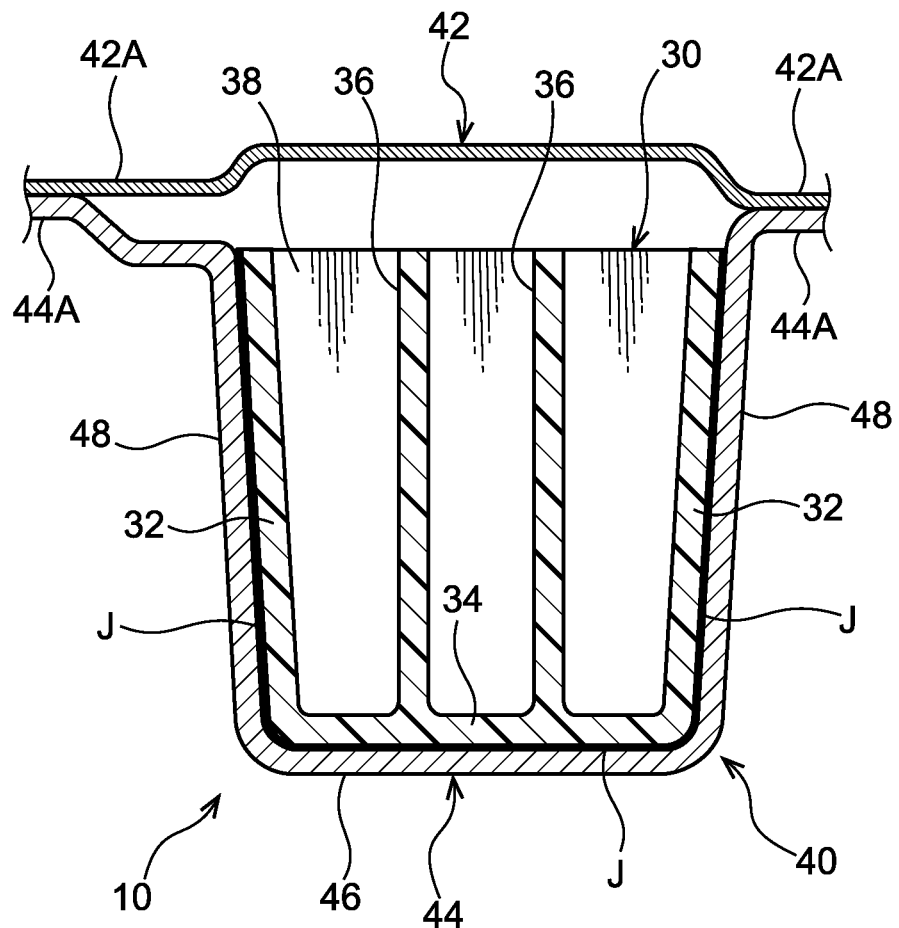
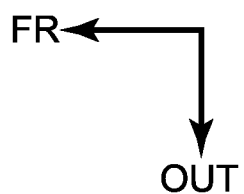

FIG.9
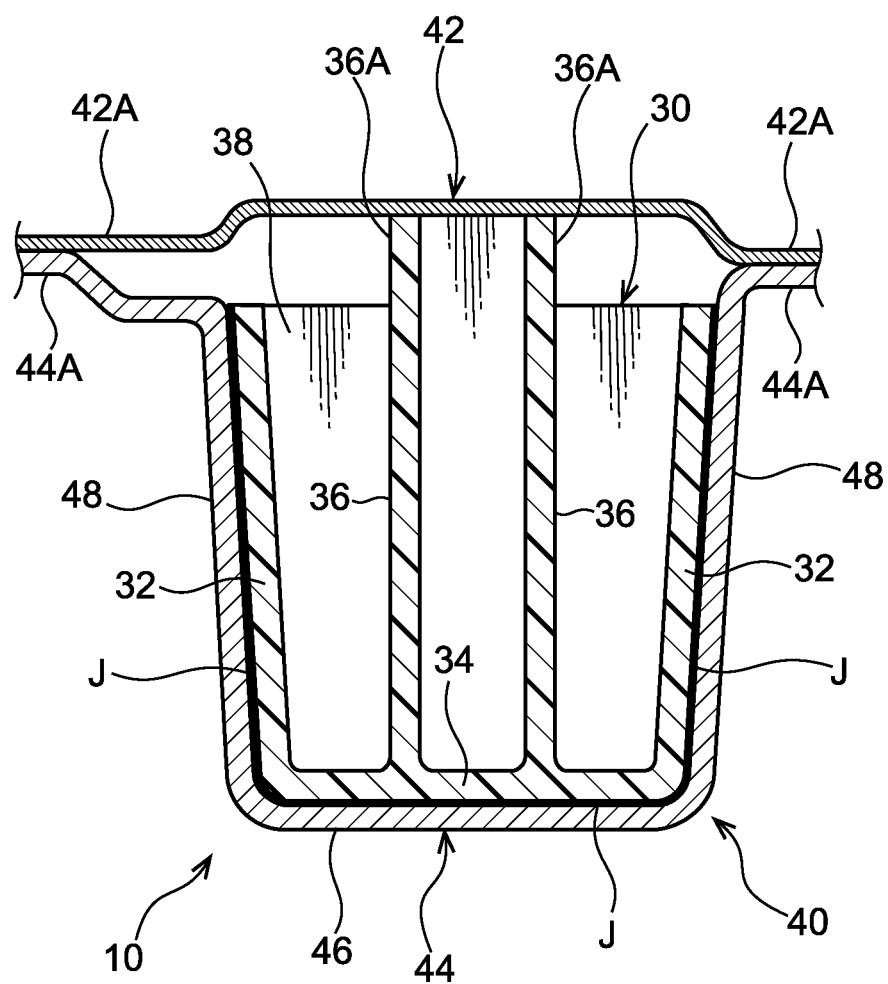
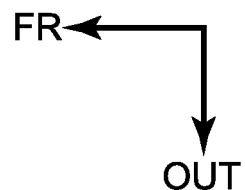

VEHICLE FRAME STRUCTURE

CROSS-REFERENCE TO RELATED APPLICATIONS

This is a national phase application based on the PCT International Patent Application No. PCT/JP2014/063597 filed May 22, 2014, claiming priority to Japanese Patent Application No. 2013-126720 filed Jun. 17, 2013, the entire contents of which are incorporated herein by reference.

TECHNICAL FIELD

The present invention relates to a vehicle frame structure.

BACKGROUND ART

Conventional vehicle frame member structures are known in which an inner portion frame member with a closed cross-section structure is disposed at a curved portion of a vehicle frame member with a closed cross-section structure, such that bending deformation occurring at the curved portion due to input of load is suppressed (see, for example, Japanese Patent Application Laid-Open (JP-A) No. 2008-126835).

SUMMARY OF INVENTION

However, there is still room for improving structures that suppress bending deformation from occurring at the frame member of the vehicle due to the input of load.

Thus an object of the present invention is to obtain a vehicle frame structure capable of suppressing bending deformation from occurring at a frame member due to input of load.

In order to achieve the above object, a vehicle frame structure of a first aspect according to the present invention includes a frame member with a closed cross-section structure including plural of wall portions configuring the frame, and a reinforcement member made of a fiber reinforced plastic and provided to an inner portion of the closed cross-section structure of the frame member, wherein the reinforcement member includes a fan shaped longitudinal wall portion, and a bottom wall portion from which the longitudinal wall portion protrudes out, and the bottom wall portion joins one end portion and another end portion of an arc of the longitudinal wall portion that are oriented in a row along a length direction of the frame member to an inner face of a wall portion at a compression deformation side of the frame member that undergoes bending deformation due to the front side member being input with load.

In the first aspect according to the present invention, the reinforcement member, made of fiber reinforced plastic and including the fan shaped longitudinal wall portion and the bottom wall portion from which the longitudinal wall portion protrudes out, joins the one end portion and the other end portion of the arc of the longitudinal wall portion oriented in a row along the length direction of the frame member to the inner face of the wall portion at the compression deformation side of the frame member that undergoes bending deformation due to being input with load.

Thus when force is applied such that the frame member undergoes bending deformation due to the input load, a circumferential direction tensile force is applied to the longitudinal wall portion of the reinforcement member, and a reactive force is generated with respect to the tensile force. Namely, bending deformation occurring in the frame member is suppressed by the reactive force. Note that the "fan shape" of the present invention includes substantial fan shapes that are not strictly fan shapes.

A vehicle frame structure of a second aspect according to the present invention is the vehicle frame structure of the first aspect, wherein orientations of fibers in the longitudinal wall portion runs along a circumferential direction of the longitudinal wall portion.

In the second aspect according to the present invention, the orientations of the fibers in the longitudinal wall portion runs along the circumferential direction of the longitudinal wall portion. Thus reactive force with respect to tensile force applied in the circumferential direction to the longitudinal wall portion is increased, compared to a case in which the fibers in the longitudinal wall portion are not oriented running along the circumferential direction of the longitudinal wall portion.

A vehicle frame structure of a third aspect according to the present invention is the vehicle frame structure of the first aspect or the second aspect, wherein a pair of the longitudinal wall portions are provided protruding out from the bottom wall portion and facing each other.

In the third aspect according to the present invention, the pair of longitudinal wall portions are provided protruding out from the bottom wall portion and facing each other. Thus reactive force with respect to tensile force applied in the circumferential direction to the longitudinal wall portions is increased, compared to a case in which the longitudinal wall portions are not provided as a pair protruding out from the bottom wall portion and facing each other.

A vehicle frame structure of a fourth aspect according to the present invention is the vehicle frame structure of the third aspect, wherein the reinforcement member includes one or plural ribs projecting out from the bottom wall portion between the longitudinal wall portions alongside and parallel to the longitudinal wall portions.

In the fourth aspect according to the present invention, the reinforcement member includes the one or plural ribs projecting out from the bottom wall portion between the longitudinal wall portions alongside and parallel to the longitudinal wall portions. Thus the reinforcement member has improved strength (rigidity) compared to a case in which the ribs are not provided to the reinforcement member.

A vehicle frame structure of a fifth aspect according to the present invention is the vehicle frame structure of the fourth aspect, wherein the rib is formed in a fan shape with orientations of fibers in the rib running along a circumferential direction of the rib.

In the fifth aspect according to the present invention, the rib is formed in a fan shape with the orientations of the fibers in the rib running along the circumferential direction of the rib. Thus reactive force with respect to tensile force applied in the circumferential direction to the rib is increased, compared to a case in which the orientation of the fibers in the rib does not run along the circumferential direction of the rib.

A vehicle frame structure of a sixth aspect according to the present invention is the vehicle frame structure of the fourth aspect or the fifth aspect, wherein the rib is close to, or in contact with, an inner face of a wall portion at a tensile deformation side of the frame member that undergoes bending deformation due to being input with load.

In the sixth aspect according to the present invention, the rib is close to, or in contact with, the inner face of the wall portion at the tensile deformation side of the frame member that undergoes bending deformation due to being input with load. Thus the rib at least contacts or presses against the tensile deformation side of the frame member when the frame member undergoes bending deformation, such that bending deformation occurring in the frame member is further suppressed.

A vehicle frame structure of a seventh aspect according to the present invention is the vehicle frame structure of any one of the third to the sixth aspect, wherein the reinforcement member includes one or plural partition wall portions that couple together mutually facing faces of the pair of longitudinal wall portions.

In the seventh aspect according to the present invention, the reinforcement member includes the one or plural partition wall portions that couple together the mutually facing faces of the pair of longitudinal wall portions. Thus the strength (rigidity) of the reinforcement member is improved, compared to a case in which the reinforcement member is not provided with partition wall portions.

As explained above, the first aspect of the present invention enables bending deformation occurring in the frame member due to input load to be suppressed.

The second aspect of the present invention enables reactive force with respect to tensile force applied in the circumferential direction to the longitudinal wall portion to be increased.

The third aspect of the present invention enables reactive force with respect to tensile force applied in the circumferential direction to the longitudinal wall portion to be increased.

The fourth aspect of the present invention enables the strength of the reinforcement member to be improved.

The fifth aspect of the present invention enables reactive force with respect to tensile force applied in the circumferential direction to the rib to be increased.

The sixth aspect of the present invention enables bending deformation occurring in the frame member due to input load to be further suppressed.

The seventh aspect of the present invention enables the strength of the reinforcement member to be improved.

BRIEF DESCRIPTION OF DRAWINGS

FIG. 8 is a cross-section taken along line Y-Y in FIG. 7 viewed in the direction indicated by the arrows.

FIG. 9 is a cross-section illustrating a modified example of ribs of a reinforcement member according to the second exemplary embodiment, illustrated similarly to FIG. 8.

DESCRIPTION OF EMBODIMENTS

Detailed explanation follows regarding exemplary embodiments of the present invention, with reference to the drawings. Note that for ease of explanation, in each of the drawings the arrow UP indicates a vehicle body upward direction, the arrow FR indicates the vehicle body front direction, and the arrow OUT indicates the vehicle width outside direction, as appropriate. In the below explanation the up-down, front-rear, and left-right directions indicate up and down in the vehicle body up-down direction, front and rear in the vehicle body front-rear direction, and left and right in the vehicle body left-right direction (vehicle width direction), unless otherwise specified. Although FIG. 1 illustrates the left side of a vehicle 12 provided with a frame structure 10 according to an exemplary embodiment, the right side of the vehicle 12 is similar, with left-right symmetry thereto.

Figure 1:
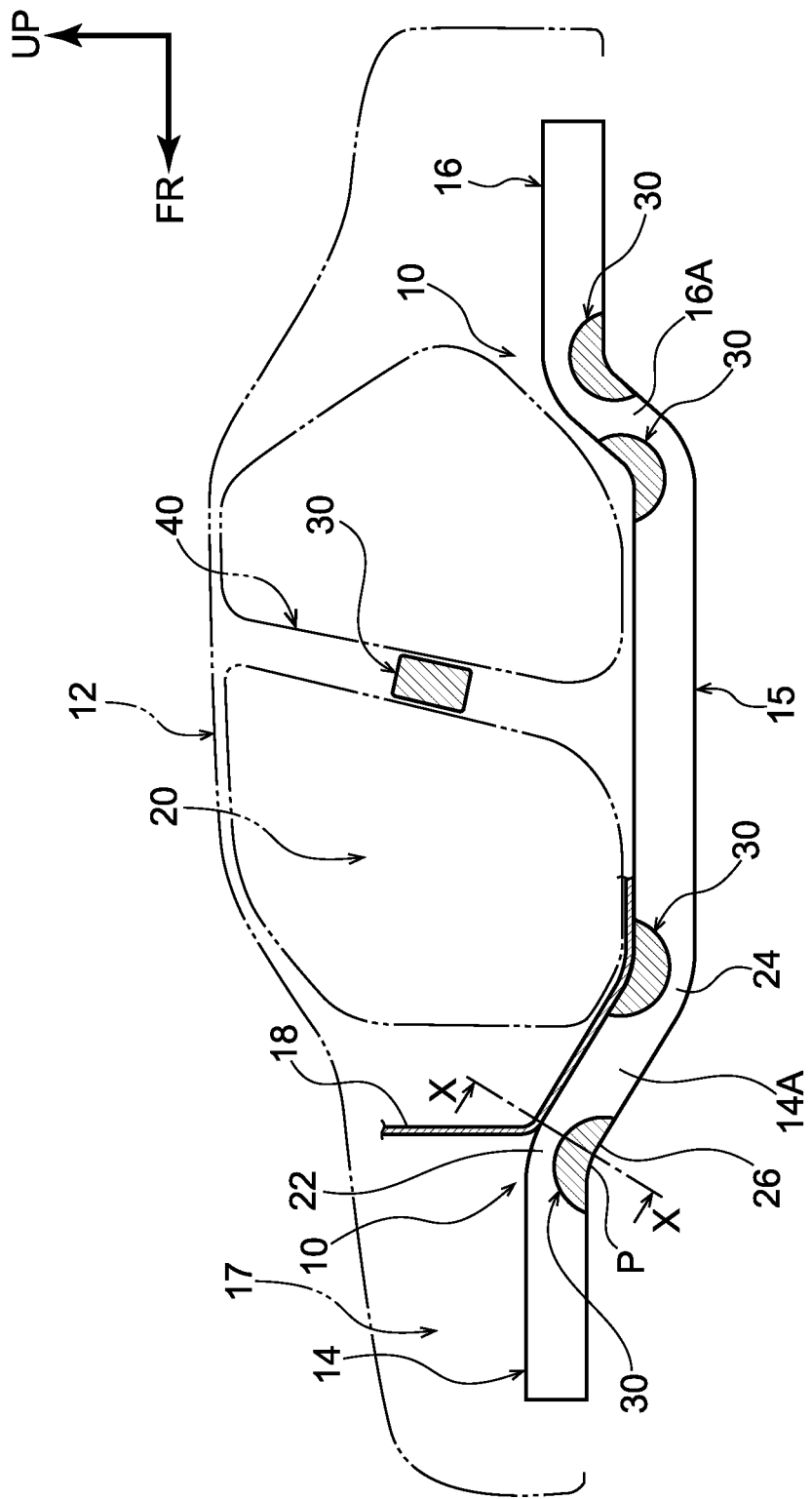
FIG. 1 is a side view schematically illustrating a configuration of a vehicle frame structure according to an exemplary embodiment.

As illustrated in FIG. 1, a pair of left and right front side members 14, each acting as a frame member with a closed cross-section structure and the length direction extending along the vehicle body front-rear direction, are provided to both side sections at a front section of the vehicle 12. A sloped portion (kick portion) 14A is formed at a partway portion of each of the front side members 14. The vehicle front side of the front side member 14 extends further to the vehicle body front side than the sloped portion 14A along the vehicle body front-rear direction at a position (elevation) that is a specific height higher than the vehicle body rear side of the front side member 14.

Moreover, a pair of left and right rear side members 16, each acting as a frame member with a closed cross-section structure and the length direction extending along the vehicle body front-rear direction, are provided to both side sections at a rear section of the vehicle 12. A sloped portion (kick portion) 16A is formed at a partway portion of each of the rear side members 16. The vehicle rear side of the rear side member 16 extends further to the vehicle body rear side than the sloped portion 16A along the vehicle body front-rear direction at a position (elevation) that is a specific height higher than the vehicle body front side of the rear side member 16.

The front side members 14 and the rear side members 16 are formed as an integral unit connected through a floor member 15 acting as a frame member with a closed cross-section structure extending along the vehicle body front-rear direction. Since the frame structure 10 of the vehicle 12 at the rear side member 16 side is similar to the frame structure 10 of the vehicle 12 at the front side member 14 side, the frame structure 10 of the vehicle 12 at the front side member 14 side is explained below as a first exemplary embodiment.

First Exemplary Embodiment

Figure 4:
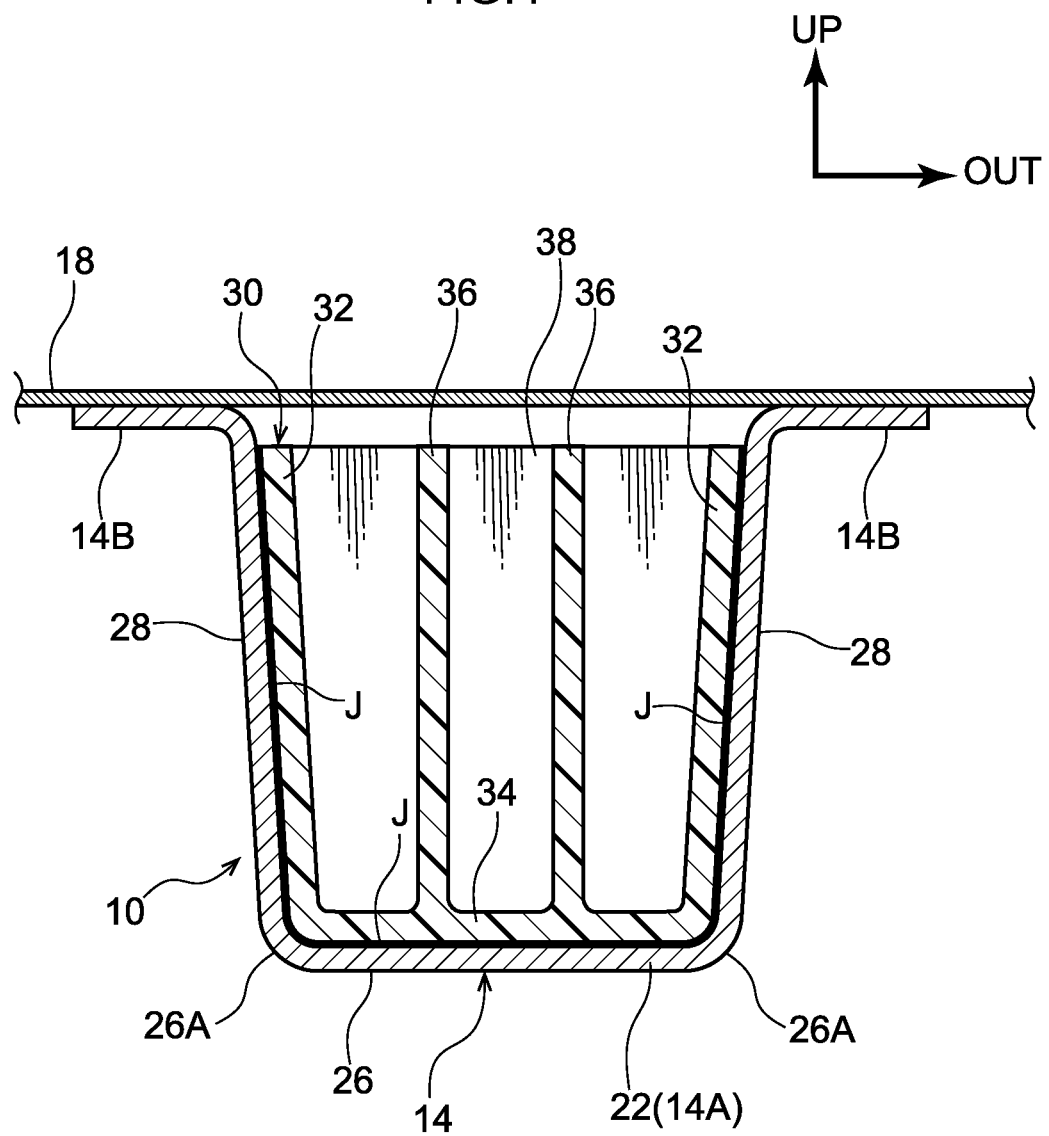
FIG. 4 is a cross-section taken along line X-X in FIG. 1 viewed in the direction indicated by the arrows.

The vehicle 12 is provided with a substantially flat plate shaped dash panel 18 that extends along upper faces of the sloped portions 14A of the front side members 14 and extends from front end portions of the sloped portions 14A in the vehicle body upward direction, separating an engine compartment room 17 from a vehicle cabin 20. As illustrated in FIG. 4, the sloped portion 14A of each front side member 14 is formed with a hat shaped cross-section, and flange portions 14B thereof are joined by welding or the like to a lower face of the dash panel 18, thereby configuring a closed cross-section structure.

As illustrated in FIG. 1, the front end portion and a rear end portion (a boundary with the floor member 15) of the sloped portion 14A form a front side bent portion 22 and a rear side bent portion 24, respectively. The front side bent portion 22 is a bent portion bulging toward the vehicle body upper side, and the rear side bent portion 24 is a bent portion bulging toward the vehicle body lower side.

Thus when load toward the vehicle body rear side is input to a front end portion of the front side member 14 during a front face collision or the like of the vehicle 12, the front side bent portion 22 undergoes folding deformation toward the vehicle body upper side (a lower wall 26, and ridge line portions 26A that form both vehicle width direction end portions of the lower wall 26 of the front side member 14 (see FIG. 4) undergo buckling deformation toward the vehicle body upper side), and the rear side bent portion 24 undergoes folding deformation (buckling deformation) toward the vehicle body lower side.

Namely, in the front side bent portion 22, the lower wall 26 side of the front side member 14 becomes the compression deformation side (the stress concentration side) wall portion, and the dash panel 18 side becomes the tensile deformation side wall portion. In the rear side bent portion 24, the dash panel 18 side of the front side member 14 becomes the compression deformation side (the stress concentration side) wall portion, and the lower wall 26 side becomes the tensile deformation side wall portion.

Reinforcement members 30, each formed of a fiber reinforced plastic (FRP) such as glass fiber reinforced plastic (GFRP) or carbon fiber reinforced plastic (CFRP), are joined to an inner face (upper face) of the lower wall 26 that is the compression deformation side wall portion of the front side bent portion 22, and the lower face of the dash panel 18 that is the compression deformation side wall portion of the rear side bent portion 24. Note that, since the reinforcement members 30 provided to the front side bent portion 22 and to the rear side bent portion 24 are the same, explanation follows regarding the reinforcement member 30 provided to the front side bent portion 22.

Figure 2:
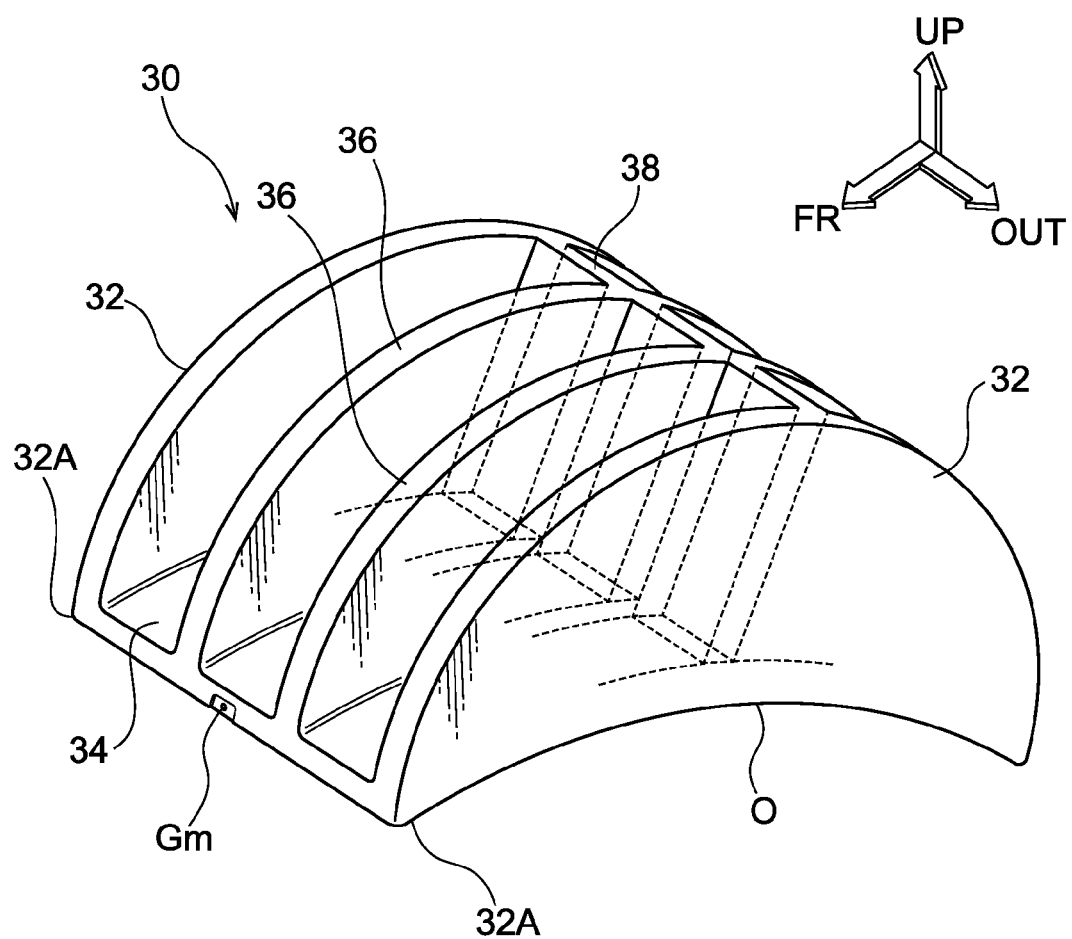
FIG. 2 is a perspective view of a reinforcement member according to a first exemplary embodiment.
Figure 3:
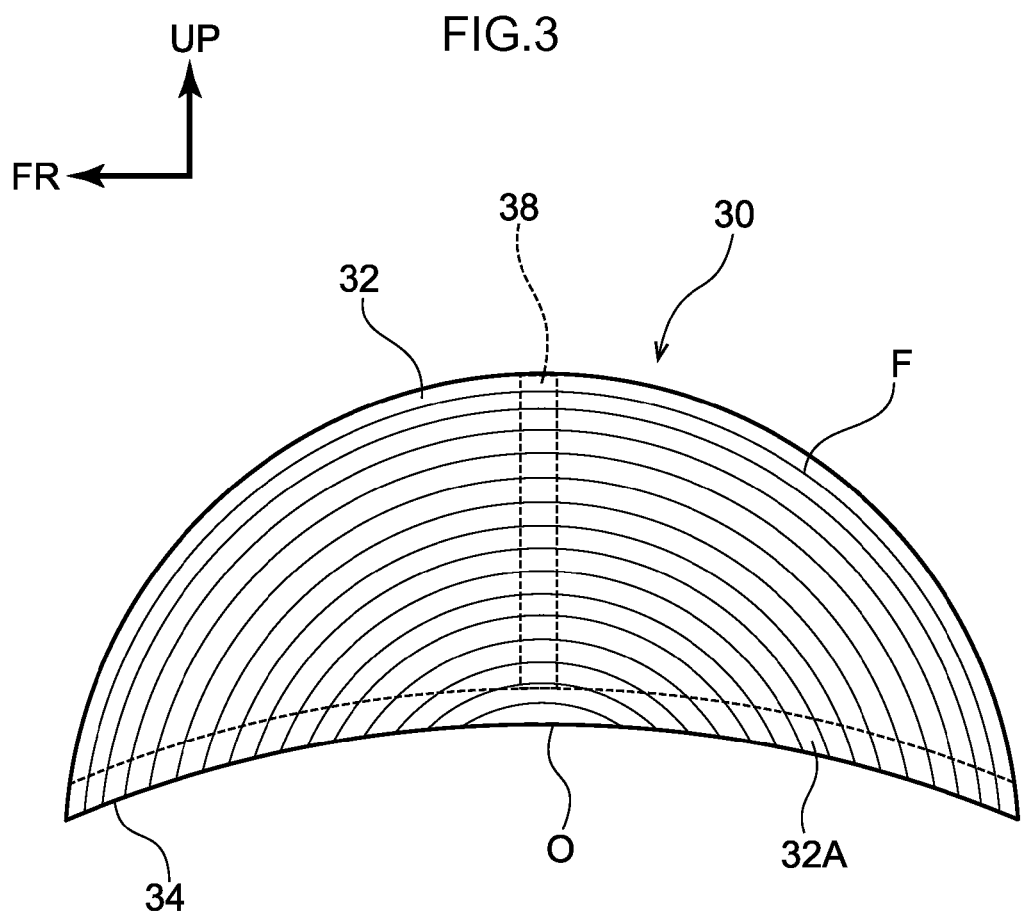
FIG. 3 is a side view illustrating orientations of fibers of a reinforcement member according to the first exemplary embodiment.

As illustrated in FIG. 2 and FIG. 3, the reinforcement member 30 includes a pair of flat plate shaped longitudinal wall portions 32 that face each other, and a rectangular flat plate shaped bottom wall portion 34 that couples together side edge portions 32A at a center O side of the pair of longitudinal wall portions 32, described later, as a single unit. In other words, the reinforcement member 30 is configured as a single unit with the pair of flat plate shaped longitudinal wall portions 32 protruding out at both end portions in the short direction (vehicle width direction) of the rectangular plate shaped bottom wall portion 34.

As illustrated in FIG. 1 to FIG. 3, in a side view viewed along the direction in which the longitudinal wall portions 32 face each other (vehicle width direction), each of the longitudinal wall portions 32 is formed as substantially fan shaped, with the center O disposed at a point of maximum curvature P of the lower wall 26 (a center angle thereof is from 180° to 270°). In a side view of the bottom wall portion 34, the bottom wall portion 34 is formed in a curved (or bent) shape that curves (or bends) in a bulging shape (a circular arc shape in this example) following the outline of the lower wall 26 toward the upper side.

The reinforcement member 30 is made by injection molding for example, and a gate mark Gm (see FIG. 2), this being the injection port of the fiber reinforced plastic, is formed at a center portion of one end portion side in the length direction (vehicle body front-rear direction) of the bottom wall portion 34. Namely, by pouring fiber reinforced plastic through a gate of a mold (not illustrated in the drawings) corresponding to this location and forming the reinforcement member 30, as illustrated in FIG. 3, fibers F in the longitudinal wall portions 32 are oriented so as to run along the circumferential direction (so as to be substantially parallel to the circumferential direction) of the longitudinal wall portions 32.

As illustrated in FIG. 1 and FIG. 4, an outer face of the bottom wall portion 34 (a face on the side from which the longitudinal wall portions 32 do not protrude out) is firmly joined to the inner face of the lower wall 26 of the front side bent portion 22 of the front side member 14 using a structural adhesive J that has a high adhesive strength. Thus the one end portion and the other end portion of the arc of each longitudinal wall portion 32 are oriented in a row along the length direction (vehicle body front-rear direction) of the front side member 14.

Note that outer faces of the longitudinal wall portions 32 may or may not be joined to inner faces of side walls 28 of the front side member 14. In FIG. 4, the outer faces of each of the longitudinal wall portions 32 are joined by the adhesive J to the inner faces of the respective side walls 28 of the front side member 14.

As illustrated in FIG. 2 and FIG. 4, the reinforcement member 30 includes plural (two, for example) plate shaped ribs 36, disposed projecting out from an inner face of the bottom wall portion 34 (a face on the side from which the longitudinal wall portions 32 protrude out) as an integral unit, so as to be alongside each other and parallel to the longitudinal wall portions 32. Each rib 36 is formed substantially fan shaped, congruent to each of the longitudinal wall portions 32, and is formed with the same or slightly thinner plate thickness than the longitudinal wall portions 32. The fibers of the ribs 36 are also oriented so as to run along the circumferential direction (so as to be substantially parallel to the circumferential direction) of the ribs 36.

Namely, the ribs 36 are formed together with the longitudinal wall portions 32 by injecting fiber reinforced plastic through the gate of the mold mentioned above, such that the orientations of the fibers of the ribs 36 is the same as the orientations of the fibers F of the longitudinal wall portions 32. Note that configuration may be made with only one rib 36 projecting out, or with no ribs 36 projecting out. The strength (rigidity) of the reinforcement member 30 improves in proportion to the number of ribs 36 projecting out.

As illustrated in FIG. 2 to FIG. 4, the reinforcement member 30 includes a flat plate shaped partition wall 38 coupling together as an integral unit mutually facing inner faces of the pair of longitudinal wall portions 32. In cases in which the partition wall 38 is formed running along the facing direction of the pair of longitudinal wall portions 32 at the inner face of the bottom wall portion 34, and the ribs 36 are also formed projecting out, the partition wall 38 is integrally formed projecting out between the ribs 36, and the height of the partition wall 38 is the same as the height of the longitudinal wall portions 32 and the ribs 36.

Note that it is sufficient that the partition wall 38 couples together the inner faces of the pair of longitudinal wall portions 32, and is not limited to a configuration projecting out from the bottom wall portion 34. A configuration may be applied, for example, in which a gap is formed between a lower end face of the partition wall 38 and the inner face of the bottom wall portion 34. The plate thickness of the partition wall 38 is the same or slightly thinner than the plate thickness of the longitudinal wall portions 32. Thus the plate thickness of the partition wall 38 is sometimes the same as the plate thickness of the ribs 36.

Figure 5:
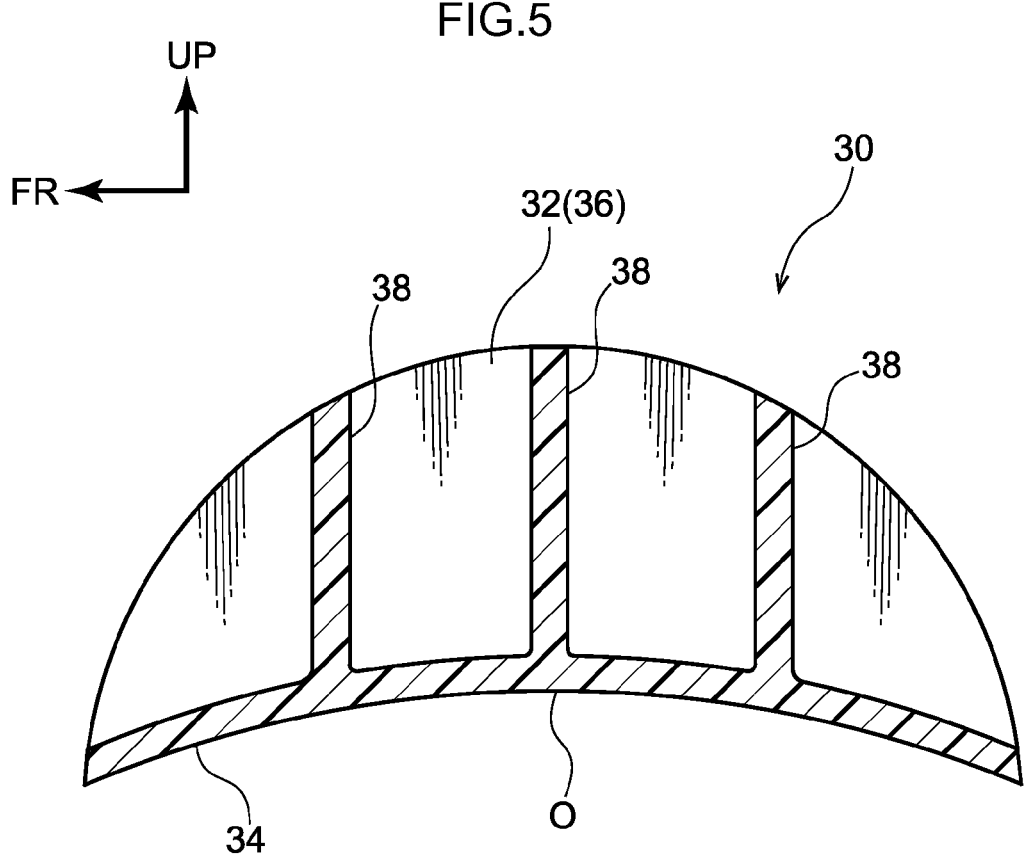
FIG. 5 is a side view illustrating a modified example of a partition wall portion of a reinforcement member according to the first exemplary embodiment.

In FIG. 2 to FIG. 4, only one partition wall 38 is illustrated projecting out at a position corresponding to the center O of the longitudinal wall portions 32 (the maximum bend point P); however configuration is not limited thereto. As illustrated in FIG. 5, for example, a configuration may be applied in which plural (for example three) partition walls 38 project out at regular intervals along the length direction (vehicle body front-rear direction) of the bottom wall portion 34. A configuration may also be applied in which no partition wall 38 is provided projecting out. The strength (rigidity) of the reinforcement member 30 improves in proportion to the number of partition walls 38 projecting out.

Figure 6:
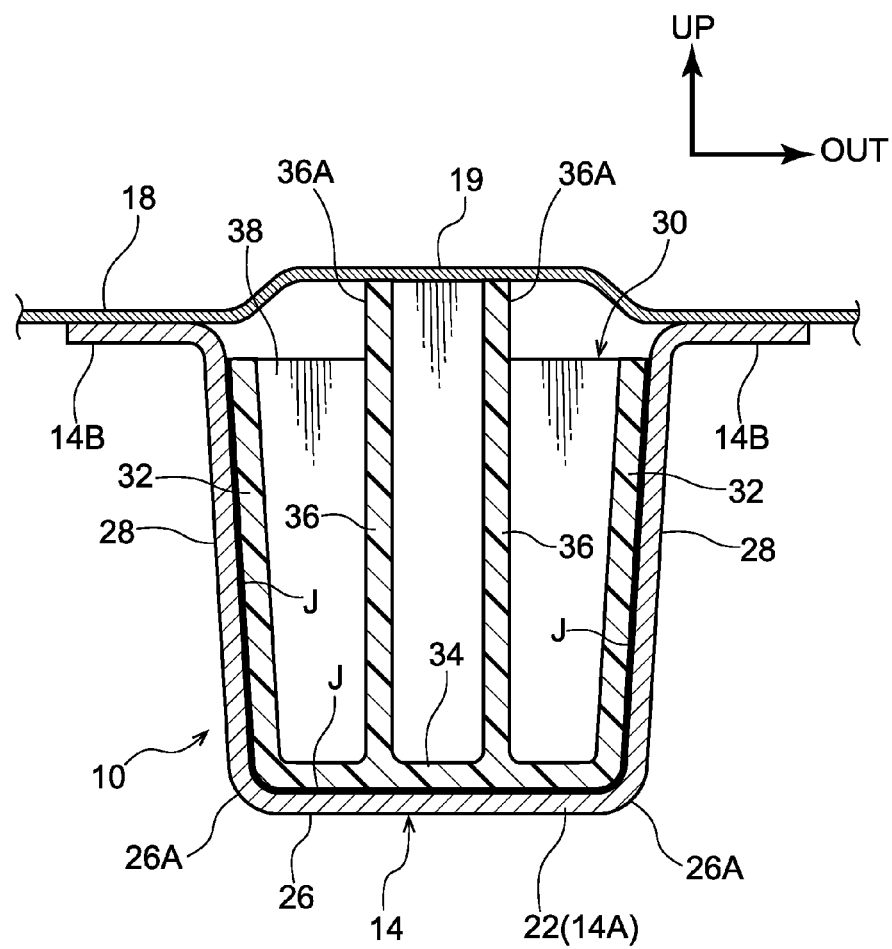
FIG. 6 is a cross-section illustrating a modified example of ribs of a reinforcement member according to the first exemplary embodiment, illustrated similarly to FIG. 3.

As illustrated in FIG. 6, the ribs 36 may be each formed in a shape including a protruding portion 36A that projects out from the longitudinal wall portions 32 in a side view viewed along the facing direction (vehicle width direction) of the pair of longitudinal wall portions 32. Configuration may be applied, for example, in which the height (radius of curvature) of a center portion along the extension direction (vehicle body front-rear direction) of the ribs 36 is higher (greater) than the height (radius of curvature) of the longitudinal wall portions 32, thereby forming substantially crescent shaped protruding portions 36A and placing the protruding portions 36A (ribs 36) close to, or in contact with, the lower face of the dash panel 18.

Note that in such an example, a configuration may be applied in which a raised portion 19, raised toward the vehicle body upper side, is formed in the dash panel 18, and the protruding portions 36A are close to, or in contact with, a lower face of the raised portion 19. In cases in which the protruding portions 36A (ribs 36) are close to the lower face of the dash panel 18 (raised portion 19), the protruding portions 36A (ribs 36) are preferably formed at least high enough to contact the lower face of the dash panel 18 (raised portion 19) in the event of folding deformation of the front side bent portion 22.

In cases in which the partition wall 38 is formed at the same position along the circumferential direction of the longitudinal wall portions 32 and the ribs 36 as the protruding portions 36A, as illustrated in FIG. 6, the height of the partition wall 38 between each of the ribs 36 may be set the same as the height of the protruding portions 36A (ribs 36). Namely, the height of the partition wall 38 may be a height that varies along the facing direction of the pair of longitudinal wall portions 32.

Explanation following regarding operation of the frame structure 10 of the vehicle 12 of the first exemplary embodiment with the above configuration.

A support portion that supports a suspension member, not illustrated in the drawings, in a suspended state, and an engine mount that supports an engine and a transmission (power unit), not illustrated in the drawings, in a suspended state, are provided at a straight portion of the front side member 14 further to the vehicle body front side than the front side bent portion 22. Load toward the vehicle body lower side is thereby input to the straight portion of the front side member 14 through the support portion and the engine mount due to vibration occurring in the vehicle 12 while the vehicle 12 is running.

The front side bent portion 22 is a location formed in advance with a bend, and is a location at which deformation originates. Thus the front side bent portion 22 sometimes undergoes resilient deformation so as to fold due to the load being input and, if the resilient deformation increased, the vehicle body rigidity would be reduced, vibration and noise would occur in the vehicle 12, and the handling stability performance of the vehicle 12 would be reduced.

However, as described above, the reinforcement member 30 is provided to the front side bent portion 22 (see FIG. 1). Namely, the outer face of the bottom wall portion 34 of the reinforcement member 30 is joined by the adhesive J to the inner face of the lower wall 26 that is the compression deformation side (stress concentration side) when the front side bent portion 22 undergoes folding deformation. Moreover, the outer faces of the longitudinal wall portions 32 are joined by the adhesive J to the respective inner faces of both side walls 28 of the front side bent portion 22.

Thus when the front side bent portion 22 undergoes resilient deformation so as to fold, the substantially fan shaped longitudinal wall portions 32 and the ribs 36 of the reinforcement member 30 are tensed along the circumferential direction thereof, such that a reactive force acting against the tensile force is generated in the longitudinal wall portions 32 and the ribs 36. In particular, the circumferential direction is the orientation direction of the fibers F (see FIG. 3), thereby enabling a stronger reactive force to be generated than in a case in which the circumferential direction is not the orientation direction of the fibers F.

In the reinforcement member 30, the partition wall 38 is formed coupled as an integral unit to the pair of longitudinal wall portions 32 in the facing direction of the longitudinal wall portions 32 (see FIG. 2, FIG. 4), thereby enabling the strength (rigidity) of the ribs 36 and the reinforcement member 30 to be increased, and enabling cross-section deformation, particularly in the vehicle width direction, of the reinforcement member 30, to be suppressed or prevented. Namely, cross-section deformation in the vehicle width direction of the front side bent portion 22 provided with the reinforcement member 30 can be suppressed or prevented by the reinforcement member 30.

Thus the strength (rigidity) of the plastic deformation region, as well as obviously the strength (rigidity) of the resilient deformation region of the front side bent portion 22, can be increased, enabling resilient deformation so as to fold the front side bent portion 22 to be suppressed. This enables vibration or noise occurring in the vehicle 12, as well as a reduction in the handling stability performance of the vehicle 12, during running of the vehicle 12 to be suppressed or prevented.

In the event of a frontal collision (a full overlap collision or an offset collision) of the vehicle 12 with an obstacle, not illustrated in the drawings, load due to the collision is input to the front end portion of the front side member 14 through front bumper reinforcement and a crush box, not illustrated in the drawings. As explained above, the reinforcement member 30 is provided to the front side bent portion 22 of the front side member 14, thus increasing the strength (rigidity) of the plastic deformation region.

Namely, a strong reactive force (resistant force) opposing the tensile force along the orientation direction (circumferential direction) of the fibers F is generated at the substantially fan shaped longitudinal wall portions 32 and ribs 36 of the reinforcement member 30, such that cross-section deformation of the reinforcement member 30 is suppressed or prevented by the partition wall 38. In cases in which the ribs 36 include the protruding portions 36A (see FIG. 6), the protruding portions 36A (ribs 36) contact or press against the lower face of the dash panel 18 during folding deformation of the front side bent portion 22.

Thus, even when collision load is input to the front end portion of the front side member 14, and the front side bent portion 22 attempts to undergo folding deformation (in particular, the lower wall 26, and the ridge line portions 26A that form both vehicle width direction end portions of the lower wall 26, attempt to undergo buckling deformation toward the vehicle body upper side), this folding deformation (buckling deformation) is efficiently suppressed.

In other words, in the event of a frontal collision of the vehicle 12, compression force applied to the maximum bend point P (the center O of the substantially fan shaped longitudinal wall portions 32 of the reinforcement member 30) at the compression deformation side (lower wall 26) of the front side bent portion 22 is reduced, and deformation at this location is lessened. Thus in the event of a frontal collision of the vehicle 12, the straight portion of the front side member 14 further to the vehicle body front side than the front side bent portion 22 can be made to undergo compression deformation (can be crushed) in the axial direction thereof (vehicle body front-rear direction) efficiently, enabling the input collision load to be efficiently absorbed by the straight portion of the front side member 14.

Thus in the reinforcement member 30 according to the first exemplary embodiment, the front side bent portion 22 (the location at which folding deformation is predicted to occur), attempting to undergo folding deformation due to load input to the front side member 14, can be efficiently locally reinforced. This enables suppression or prevention of a reduction in collision safety performance that would accompany a compression deformation defect in the axial direction of the front side member 14, and an increase in the folding deformation amount of the front side bent portion 22.

Namely, in the event of a frontal collision of the vehicle 12, deformation of the vehicle cabin 20 can be suppressed or prevented, and a wide space can be secured in the front-rear direction of the vehicle cabin 20. Moreover, being made of fiber reinforced plastic, the reinforcement member 30 has a lighter weight, enabling fuel consumption to be improved and exhaust gas to be reduced compared to a structure reinforced by sheet metal or the like. Note that similar applies in cases in which the reinforcement member 30 is provided to the rear side curved portion 24, and the front side bent portion and the rear side bent portion of each rear side member 16.

Second Exemplary Embodiment

Being made of fiber reinforced plastic, the reinforcement member 30 has a lighter weight, and so can be provided to all locations at which the occurrence of folding deformation is predicted in the event of a collision of the vehicle 12. Namely, from out of frame members with a closed cross-section structure configuring the frame of the vehicle 12, rather than locations that are formed by bending in advance, for example, an inner portion of a straight center cross member (not illustrated in the drawings) with a hat shaped cross-section configuring a closed cross-section structure with a floor panel (not illustrated in the drawings), or an inner portion of a center pillar 40 extending in a substantially straight shape along the vehicle body up-down direction, or the like, may be provided with the reinforcement member 30.

Explanation follows regarding a second exemplary embodiment, in which the reinforcement member 30 is provided to the inner portion of the center pillar 40, this being an example of a location that is not formed by bending in advance. Note that the same reference numerals are appended to locations corresponding to those in the first exemplary embodiment, and detailed explanation (including common operation) is omitted as appropriate.

Figure 7:
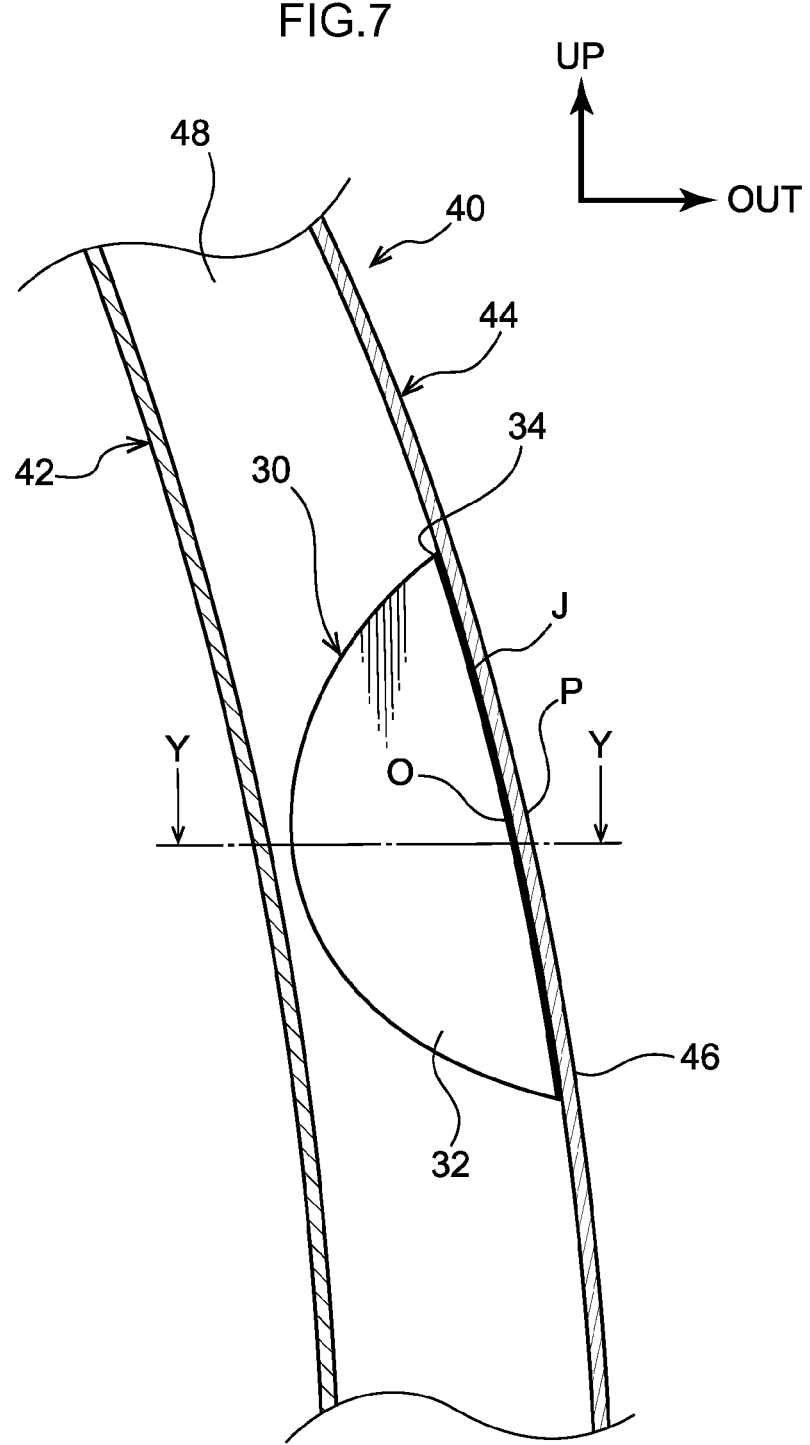
FIG. 7 is a vertical cross-section of a center pillar provided with a reinforcement member according to a second exemplary embodiment.

As illustrated in FIG. 1, FIG. 7, and FIG. 8, the center pillar 40 includes a substantially flat plate shaped inner panel 42 disposed at the vehicle width direction inside extending along the vehicle body up-down direction, and an outer panel 44 with a hat shaped cross-section disposed at the vehicle width direction outside extending along the vehicle body up-down direction. Flange portions 42A of the inner panel 42 and respective flange portions 44A of the outer panel 44 are joined together by welding or the like, thereby forming a closed cross-section structure.

In the event of a side-on collision of the vehicle 12, a portion of the center pillar 40 (a location at which folding deformation is predicted to occur, such as a belt line portion) undergoes folding deformation toward the vehicle width direction inside. Namely, an outside wall 46 of the outer panel 44 becomes the compression deformation side, and the inner panel 42 becomes the tensile deformation side. The reinforcement member 30 is therefore provided to an inner face of the outside wall 46 of the outer panel 44 such that the one end portion and the other end portion of the arc of each longitudinal wall portion 32 are oriented in a row along the length direction of the center pillar 40 (vehicle body up-down direction).

Namely, in a side view viewed along the vehicle body front-rear direction, the bottom wall portion 34 of the reinforcement member 30 provided to the inner portion of the center pillar 40 is formed in a curved shape that curves in a slight bulging shape (a circular arc shape in this example) toward the vehicle width direction outside along the shape of the outside wall 46 of the outer panel 44. The longitudinal wall portions 32 of the reinforcement member 30 are thereby substantially fan shaped, with a center angle of approximately 180° (specifically, an angle that is slightly smaller than 180°) in a face-on view.

The outer face of the bottom wall portion 34 of the reinforcement member 30 is joined by the adhesive J to an inner face of the outside wall 46, such that the center O of the substantially fan shaped longitudinal wall portions 32 is disposed at a position predicted to be the maximum bend point P of the outside wall 46 when the outside wall 46 of the outer panel 44 undergoes folding deformation toward the vehicle width direction inside due to a side-on collision of the vehicle 12.

Note that, in this reinforcement member 30, the outer faces of the longitudinal wall portions 32 are also joined by the adhesive J to respective inner faces of both of the side walls 48 of the outer panel 44 (see FIG. 8). Moreover, as illustrated in FIG. 9, a configuration may be applied in which the ribs 36 including the protruding portions 36A project out from the reinforcement member 30, and the protruding portions 36A (ribs 36) are close to, or in contact with, the inner face of the inner panel 42.

The frame structure 10 of the vehicle 12 according to the second exemplary embodiment with the above configuration achieves the same operation as the first exemplary embodiment. Namely, in the event of a side-on collision of the vehicle 12, a portion of the outside wall 46 of the center pillar 40 (the outer panel 44) (the belt line portion at which folding deformation is predicted to occur) undergoes folding deformation (buckling deformation) toward the vehicle width direction inside. The reinforcement member 30 is therefore provided to this portion of the outside wall 46.

Thus when the portion of the outside wall 46 undergoes folding deformation (buckling deformation) toward the vehicle width direction inside, the substantially fan shaped longitudinal wall portions 32 and ribs 36 of the reinforcement member 30 are tensed along the circumferential direction thereof, namely the orientation direction of the fibers F, such that a strong reactive force (resistant force) acting against the tensile force is generated in the longitudinal wall portions 32 and the ribs 36.

Moreover, since cross-section deformation of the reinforcement member 30 in the vehicle body front-rear direction is suppressed or prevented by the partition wall 38, cross-section deformation of the outer panel 44 in the vehicle body front-rear direction is also suppressed or prevented. Thus folding deformation (buckling deformation) of the portion of the outside wall 46 toward the vehicle width direction inside is efficiently suppressed, and deformation of the vehicle cabin 20 is suppressed.

The frame structure 10 of the vehicle 12 according to the present exemplary embodiments has been explained above based on the drawings; however the frame structure 10 of the vehicle 12 according to the present exemplary embodiments is not limited to that illustrated in the drawings, and appropriate design modifications may be applied within a range not departing from the spirit of the present invention. The longitudinal wall portions 32, for example, are not limited to the configuration in which the pair of longitudinal wall portions 32 face each other protruding out from the inner face of the bottom wall portion 34, and a configuration may be applied in which a single longitudinal wall portion 32 formed with a thicker plate thickness protrudes out at a short direction center portion (or across the entire short direction) of the inner face of the bottom wall portion 34.

Note that the center angle of each longitudinal wall portion 32 is not 90° or less (the center angle of the longitudinal wall portion 32 is greater than 90°). Moreover, in a case in which neither the ribs 36 nor the partition wall 38 are formed, by only providing the pair of longitudinal wall portions 32 facing each other and protruding out from the inner face of the bottom wall portion 34, the strength (rigidity) of the reinforcement member 30 may be increased by, for example, forming the plate thickness of the longitudinal wall portions 32 thicker than that illustrated in the drawings.

Moreover, the reinforcement member 30 is not limited to being configured joined to the front side member 14 or the center pillar 40 (the outer panel 44) and so on by the adhesive J, and may be configured, for example, joined by a joining member, not illustrated in the drawings, such as nuts and bolts or rivets. Furthermore, the reinforcement member 30 may be provided to the front pillar or the like, and may be configured provided to the front side member 14, the center pillar 40, the front pillar, or the like by insert molding or prepreg molding.

Furthermore, the reinforcement member 30 may be provided to an outer portion, rather than the inner portion of the front side bent portion 22 of the front side member 14. Namely, a configuration may be applied in which the inner face of the bottom wall portion 34 is joined to an outer face (lower face) of the lower wall 26 of the front side bent portion 22, and the inner faces of the longitudinal wall portions 32 are joined to respective outer faces of the side walls 28 of the front side bent portion 22. Note that in such a case, the ribs 36 and the partition wall 38 are not formed to the reinforcement member 30.

The entire contents of the disclosure of Japanese Patent Application No. 2013-126720 are incorporated by reference in the present specification. All publications, patent applications, and technical standards mentioned in the present specification are incorporated by reference in the present specification to the same extent as if the individual publication, patent application, or technical standard was specifically and individually indicated to be incorporated by reference.

The invention claimed is:

1. A vehicle frame structure comprising:
 a frame member with a closed cross-section structure including a plurality of wall portions configuring the frame; and
 a reinforcement member made of a fiber reinforced plastic and provided on an inner portion of the closed cross-section structure of the frame member, wherein
 the reinforcement member includes a semi-circular shaped longitudinal wall portion, and a bottom wall portion from which the longitudinal wall portion protrudes out, and
 the bottom wall portion joins one end portion and another end portion of an arc of the longitudinal wall portion and is oriented in a row along a length direction of the frame member up to an inner face of a wall portion of the plurality of wall portions configuring the frame at a compression deformation side of the frame member that undergoes bending deformation due to the frame member being input with load.

2. The vehicle frame structure of claim 1, wherein orientations of fibers in the longitudinal wall portion runs along a circumferential direction of the longitudinal wall portion.

3. The vehicle frame structure of claim 1, wherein a pair of the longitudinal wall portions are provided protruding out from the bottom wall portion and facing each other.

4. The vehicle frame structure of claim 3, wherein the reinforcement member includes one or a plurality of ribs projecting out from the bottom wall portion between the longitudinal wall portions alongside and parallel to the longitudinal wall portions.

5. The vehicle frame structure of claim 4, wherein the rib is formed in a fan shape with orientations of fibers in the rib running along a circumferential direction of the rib.

6. The vehicle frame structure of claim 4, wherein the rib is close to, or in contact with, an inner face of a wall portion at a tensile deformation side of the frame member that undergoes bending deformation due to being input with load.

7. The vehicle frame structure of claim 3, wherein the reinforcement member includes one or a plurality of partition wall portions that couple together mutually facing faces of the pair of longitudinal wall portions.

* * * * *